US012223931B1

(12) United States Patent
Miller

(10) Patent No.: US 12,223,931 B1
(45) Date of Patent: Feb. 11, 2025

(54) WIND INSTRUMENT ELECTRONIC WARMING CASE

(71) Applicant: Jessica Miller, Gray, GA (US)

(72) Inventor: Jessica Miller, Gray, GA (US)

( * ) Notice: Subject to any disclaimer, the term of this patent is extended or adjusted under 35 U.S.C. 154(b) by 224 days.

(21) Appl. No.: 18/084,621

(22) Filed: Dec. 20, 2022

(51) Int. Cl.
*G10G 7/00* (2006.01)
*H05B 3/22* (2006.01)

(52) U.S. Cl.
CPC ............... *G10G 7/005* (2013.01); *H05B 3/22* (2013.01)

(58) Field of Classification Search
CPC ............. G10G 7/005; G10G 7/00; H05B 3/22
See application file for complete search history.

(56) References Cited

U.S. PATENT DOCUMENTS 2,615,112 A 10/1952 Lagan
4,529,865 A 7/1985 Oakes, Jr.
5,920,022 A 7/1999 Ashwood, Jr.
6,670,536 B2 12/2003 Godin
D746,047 S 12/2015 Hungate
2010/0264048 A1* 10/2010 Gunsberg .............. A45C 15/00 220/592.2
2018/0098380 A1 4/2018 Bannister

FOREIGN PATENT DOCUMENTS

WO WO-2007084565 A2 * 7/2007 ........... A45C 13/021
WO 2010120483 10/2010

* cited by examiner

*Primary Examiner* — Kimberly R Lockett
(74) *Attorney, Agent, or Firm* — Kyle A. Fletcher, Esq.

(57) ABSTRACT

The wind instrument electronic warming case comprises an instrument case, a temperature control subsystem, and an operator interface. The temperature control subsystem may comprise one or more heating elements and one or more air moving devices that may vary the temperature of a musical instrument that is stored within the instrument case. As a non-limiting example, the musical instrument may be a flute. Storing the musical instrument within the instrument case may eliminate the need for the musical instrument to acclimate to room temperature or be warmed after being in a cold environment and may prevent thermal contraction and expansion which may alter the tonal qualities of the musical instrument. The operator interface may be adapted for a user to monitor and control the operation of the temperature control subsystem.

19 Claims, 4 Drawing Sheets

WIND INSTRUMENT ELECTRONIC WARMING CASE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of musical instrument cases, more specifically, a wind instrument electronic warming case.

SUMMARY OF INVENTION

The wind instrument electronic warming case comprises an instrument case, a temperature control subsystem, and an operator interface. The temperature control subsystem may comprise one or more heating elements and one or more air moving devices that may vary the temperature of a musical instrument that is stored within the instrument case. As a non-limiting example, the musical instrument may be a flute. Storing the musical instrument within the instrument case may eliminate the need for the musical instrument to acclimate to room temperature or be warmed after being in a cold environment and may prevent thermal contraction and expansion which may alter the tonal qualities of the musical instrument. The operator interface may be adapted for a user to monitor and control the operation of the temperature control subsystem.

An object of the invention is to provide an instrument case for storing a musical instrument.

Another object of the invention is to provide one or more heating elements and one or more air moving devices within the instrument case.

A further object of the invention is to provide control electronics for controlling the operation of the one or more heating elements and the one or more air moving devices and an operator interface for directing and monitoring the control electronics.

Yet another object of the invention is to energize the one or more heating elements and/or the one or more air moving devices if the temperature of the air within the instrument case deviates from a setpoint temperature.

These together with additional objects, features and advantages of the wind instrument electronic warming case will be readily apparent to those of ordinary skill in the art upon reading the following detailed description of the presently preferred, but nonetheless illustrative, embodiments when taken in conjunction with the accompanying drawings.

In this respect, before explaining the current embodiments of the wind instrument electronic warming case in detail, it is to be understood that the wind instrument electronic warming case is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the wind instrument electronic warming case.

It is therefore important that the claims be regarded as including such equivalent construction insofar as they do not depart from the spirit and scope of the wind instrument electronic warming case. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
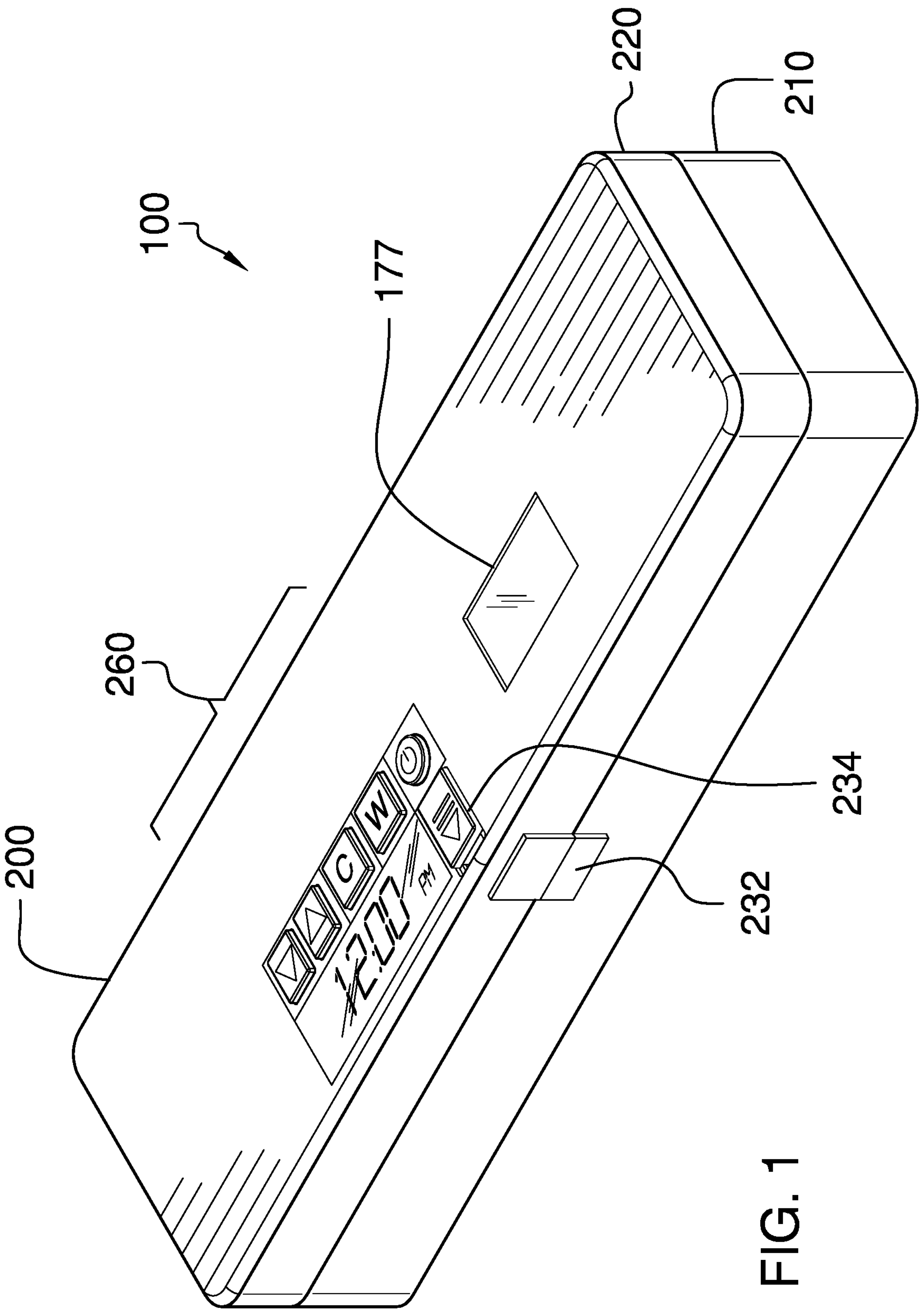
FIG. 1 is a front isometric view of an embodiment of the disclosure.
Figure 2:
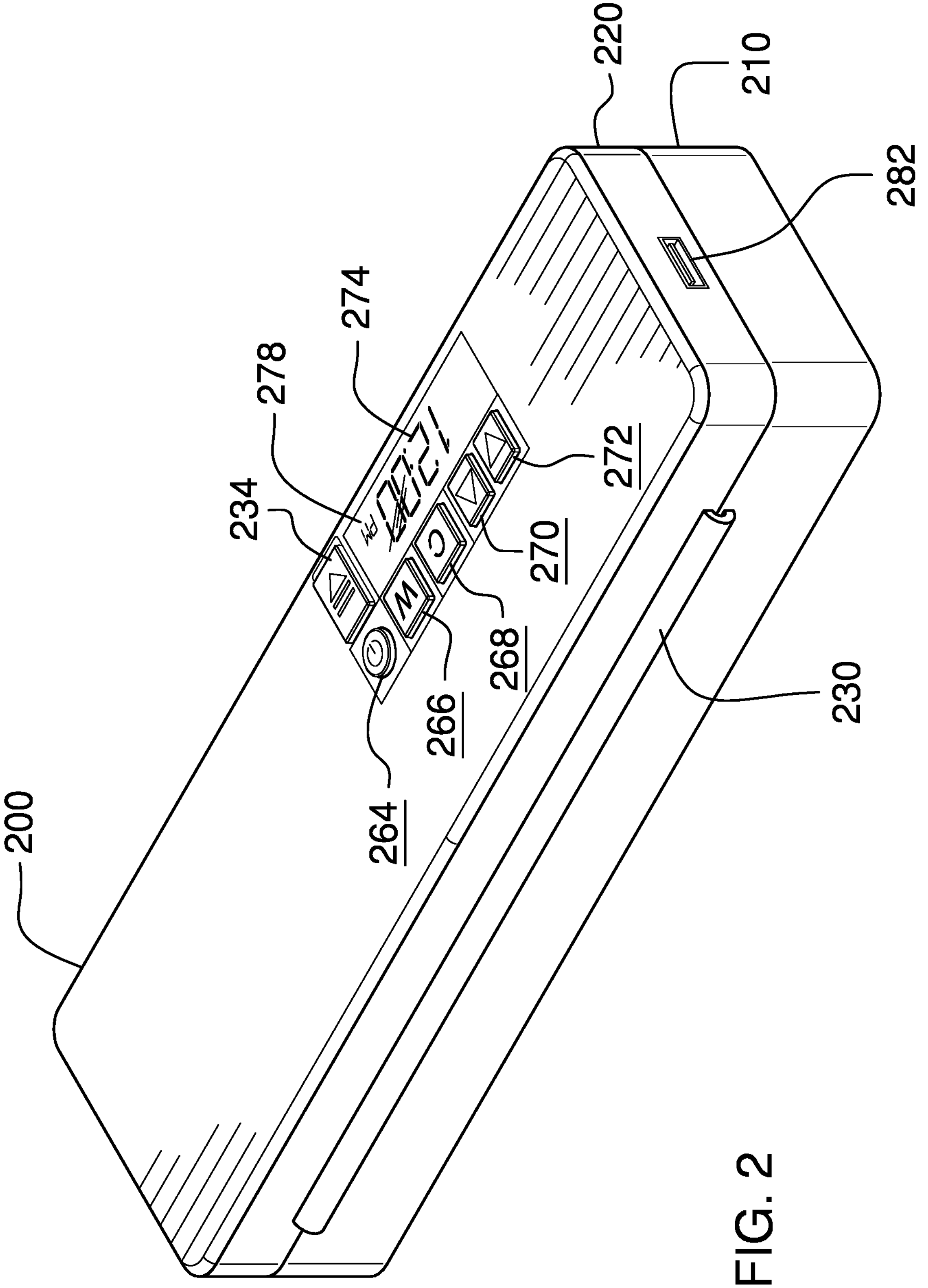
FIG. 2 is a rear isometric view of an embodiment of the disclosure.
Figure 3:
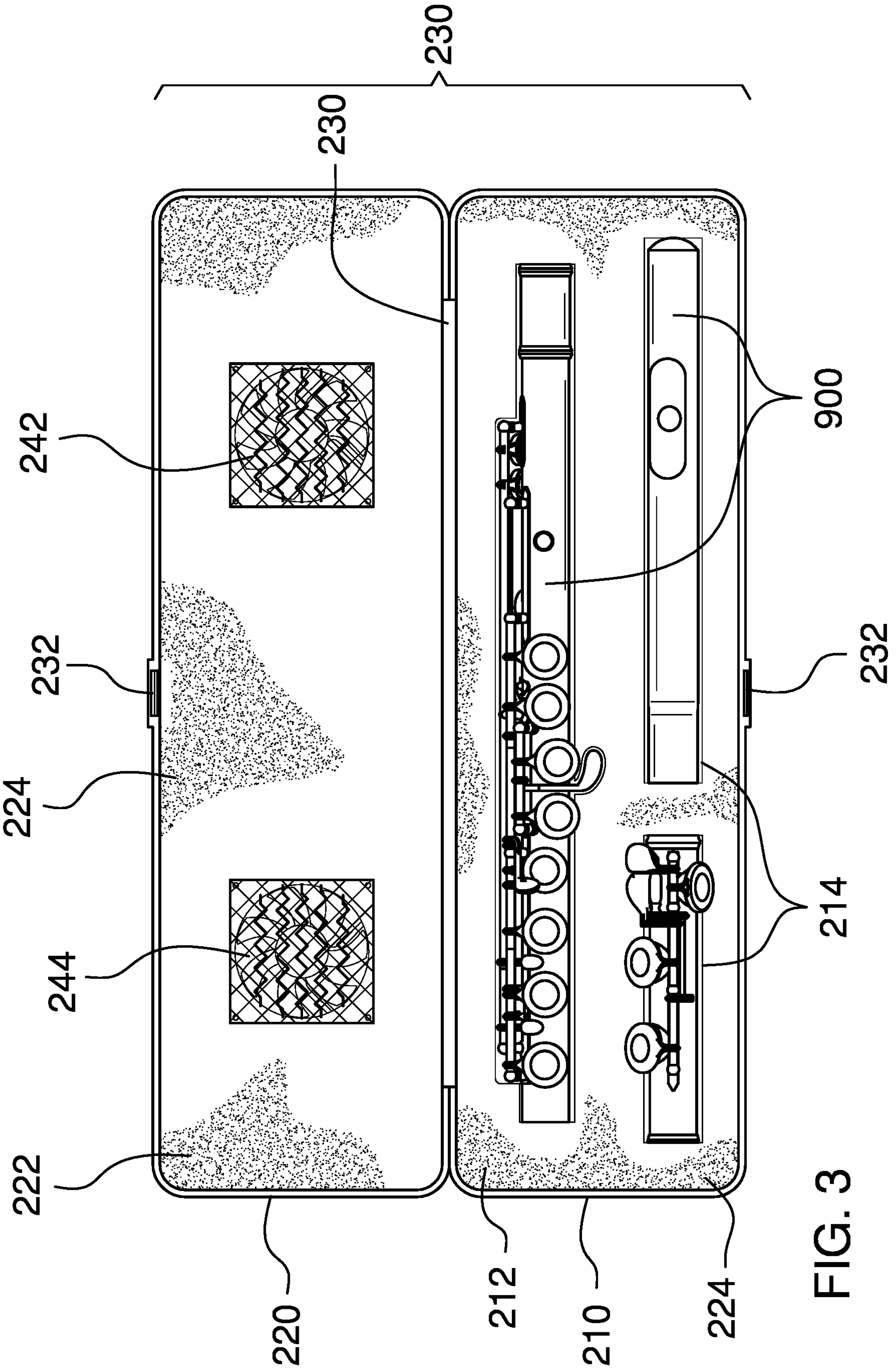
FIG. 3 is a top view of an embodiment of the disclosure, illustrating the instrument case open.
Figure 4:
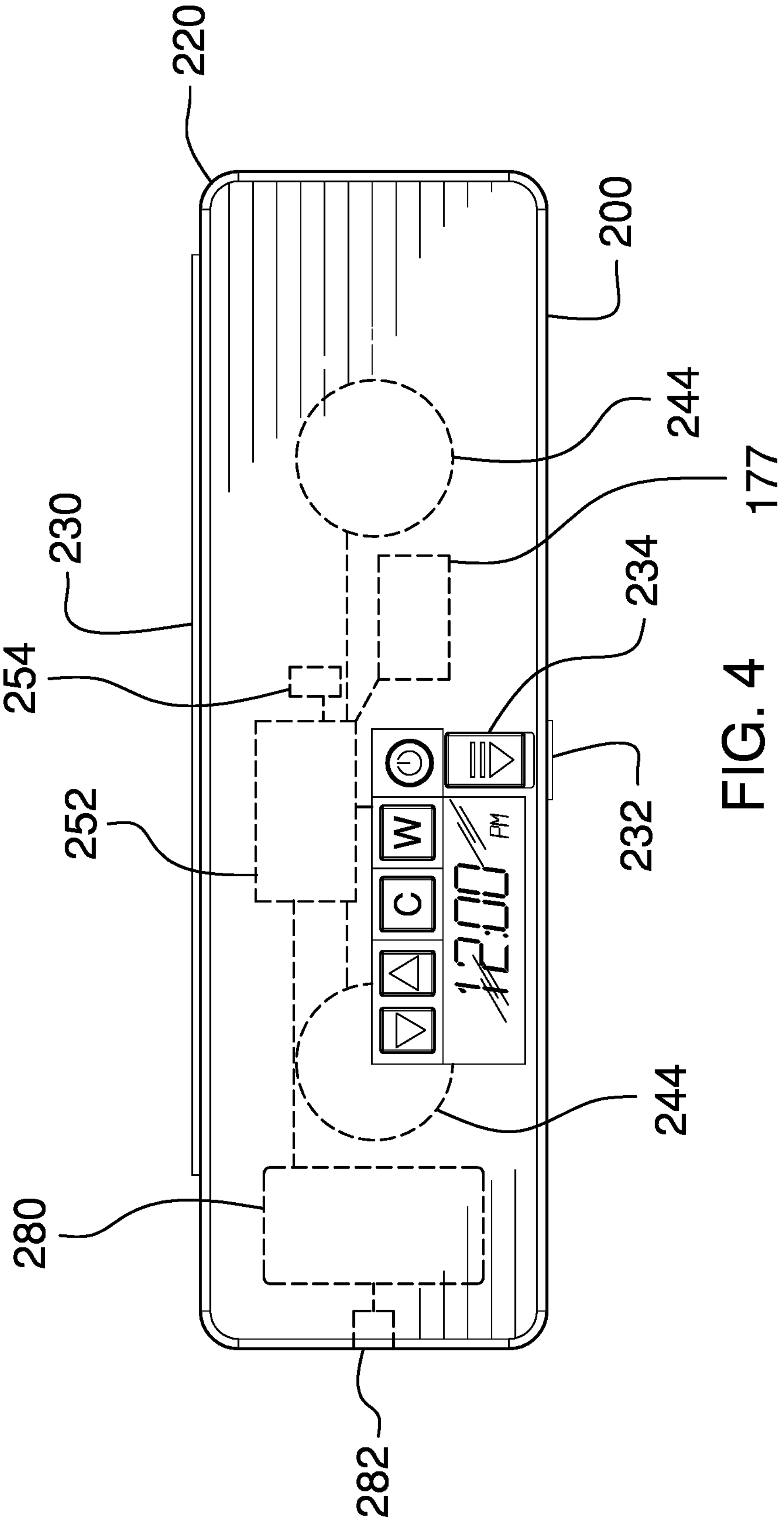
FIG. 4 is a top view of an embodiment of the disclosure, illustrating the instrument case closed.

Detailed reference will now be made to a first potential embodiment of the disclosure, which is illustrated in FIGS. 1 through 4.

The wind instrument electronic warming case 100 (hereinafter invention) comprises an instrument case 200, a temperature control subsystem, and an operator interface 260. The temperature control subsystem may comprise one or more heating elements 242 and one or more air moving devices 244 that may vary the temperature of a musical instrument 900 that is stored within the instrument case 200. As a non-limiting example, the musical instrument 900 may be a flute. Storing the musical instrument 900 within the instrument case 200 may eliminate the need for the musical instrument 900 to acclimate to room temperature or be warmed after being in a cold environment and may prevent thermal contraction and expansion which may alter the tonal qualities of the musical instrument 900. The operator interface 260 may be adapted for a user to monitor and control the operation of the temperature control subsystem.

The instrument case 200 may be a container for storing the musical instrument 900. The instrument case 200 may comprise a bottom section 210 and a top section 220 that may be hingedly coupled via one or more hinges 230. The bottom section 210 and the top section 220 may form a rigid hollow shell. Shaped inserts within the instrument case 200 may adapt the instrument case 200 to hold the musical instrument 900 and the temperature control subsystem.

A bottom shaped insert 212 may be coupled to the interior of the bottom section 210. The bottom shaped insert 212 may comprise a plurality of cavities 214. The plurality of cavities 214 may provide contours that may be adapted to accept the musical instrument 900 once the musical instrument 900 has been disassembled. A top shaped insert 222 may be coupled to the interior of the top section 220. The top shaped insert 222 may be shaped to fit around the temperature control subsystem.

The bottom shaped insert 212 and the top shaped insert 222 may be made from a non-scratch material such that the finish of the musical instrument 900 is not damaged when the musical instrument 900 is stored within the instrument case 200. As a non-limiting example, the bottom shaped insert 212 and the top shaped insert 222 may be made from foam. In some embodiments, the bottom shaped insert 212 and the top shaped insert 222 may be lined with velvet 224.

In some embodiments, a gap between the bottom shaped insert and the top shaped insert 222 may provide space for air to move through the instrument case 200.

The instrument case 200 may comprise one or more latches 232 located on the side of the instrument case 200 that is opposite the one or more hinges 230. The one or more latches 232 may hold the instrument case 200 closed until the one or more latches 232 are released. As a non-limiting example, the one or more latches 232 may be released by activating a latch button 234.

A fingerprint scanner 177 may be included with the invention 100. Furthermore, the fingerprint scanner 177 would be wired to the microcontroller 252 such that when a fingerprint is scanned, and matches that of an end user, the one or more latches 232 is unlocked via the microcontroller 252. Fingerprint scanners and electronic locks are well known in the art.

The temperature control subsystem may comprise the one or more heating elements 242, the one or more air moving devices 244, and control electronics. The one or more heating elements 242 may heat the air within the instrument case 200 when energized. The one or more air moving devices 244 may move the air within the instrument case 200 when energized. The control electronics may control the energization of the one or more heating elements 242 and the one or more air moving devices 244 to achieve an overall warming or cooling of the musical instrument 900 stored within the instrument case 200.

The one or more heating elements 242 may convert electrical energy into heat. As non-limiting examples, the one or more heating elements 242 may comprise one or more resistance wires made of metallic alloys such as nickel/chromium, iron/chromium/aluminum, or copper/nickel, ceramic or semiconductor elements such as molybdenum disilicide or silicon carbide, PTC ceramic elements, PTC polymer elements, or combinations thereof. The amount of heating produced by the one or more heating elements 242 may vary based upon one or more characteristics of the electrical energy applied to the one or more heating elements 242. As non-limiting examples, the one or more heating elements 242 may heat proportionally with the voltage, amperage, or frequency of the electrical energy applied to the one or more heating elements 242.

The one or more air moving devices 244 may force the movement of the air. The one or more air moving devices 244 may be electromechanical in nature. As non-limiting examples, the one or more air moving devices 244 may be a fan or a blower. The one or more air moving devices 244 may move the air within the instrument case 200 such that the air passes over the one or more heating elements 242. In so doing, the one or more air moving devices 244 may transfer heat from the one or more heating elements 242 to the musical instrument 900 via the flow of the air.

Energization of the one or more air moving devices 244 while the one or more heating elements 242 are not energized may result in a non-heated flow of the air over the musical instrument 900 and may have a cooling effect upon the musical instrument 900. In some embodiments, the one or more air moving devices 244 may be vented to the outside such that the one or more air moving devices 244 may draw the air in from outside of the instrument case 200, may expel the air out of the instrument case 200, or both.

The control electronics may comprise a microcontroller 252 and one or more temperature sensors 254. The microcontroller 252 may be a single-chip microprocessor comprising non-volatile memory for storing a control program, read/write memory for storing data and intermediate computations, one or more input/output ports for interfacing with circuitry located outside of the microcontroller 252, and a timer circuit for timing intervals.

The one or more temperature sensors 254 may measure the temperature of the air and may report the temperature to the microcontroller 252 as one or more electrical signals. The one or more temperature sensors 254 may be positioned in the flow of the air. The one or more temperature sensors 254 may be a thermistor, which is well known in the art.

In at least one mode of operation, the control electronics may maintain the temperature of the air at a setpoint temperature by energizing and de-energizing the one or more heating elements 242 and/or the one or more air moving devices 244.

The operator interface 260 may comprise operator controls and an operator display 274. The operator interface 260 may be adapted for the user to interact with the invention 100 for purposes of monitoring and controlling operation of the invention 100.

The operator controls may comprise a power control 264, a warm control 266, a cool control 268, an up control 270, and a down control 272. The operator controls may be electrically coupled to the microcontroller 252 such that the microcontroller 252 may detect activations of the operator controls. The power control 264 may energize and de-energize the invention 100. The warm control 266 may select a heating mode of operation which may result in energization of the one or more heating elements with or without the one or more air moving devices 244. The cool control 268 may select a cooling mode of operation which may result in energization of the one or more air moving devices 244 without the one or more heating elements 242. The up control 270 may increase the setpoint temperature. The down control 272 may decrease the setpoint temperature.

The operator display 274 may be adapted to display a numeric value to the user. In a preferred embodiment, the operator display 274 may comprise a four digit numeric display and an AM/PM indicator 278. As a non-limiting example, the operator display 274 may display the temperature of the air, the setpoint temperature, the time of day, a time interval for operating the temperature control subsystem, or any combination thereof.

One or more batteries 280 may comprise one or more energy-storage devices. The one or more batteries 280 may be a source of electrical energy to operate the temperature control subsystem and the control electronics. The one or more batteries 280 may be rechargeable and/or replaceable. The one or more batteries 280 may be recharged using an external dc power adapter coupled to a recharging port 282 that is accessible on the side wall of the instrument case 200.

In use, the musical instrument 900 may be disassembled and stored within the instrument case 200 by placing the pieces of the musical instrument 900 into the plurality of cavities 214 within the instrument case 200. The instrument case 200 may be closed and latched. In cold weather, the user may activate the operator controls to select a heating mode of operation and to establish the setpoint temperature. In the heating mode of operation, the control electronics may energize the one or more heating elements 242 if the temperature of the air is below the setpoint temperature and may de-energize the one or more heating elements 242 when the temperature reaches or exceeds the setpoint temperature. In the heating mode of operation, the control electronics may energize the one or more air moving devices 244 to circulate the air. In the cooling mode of operation, the control electronics may activate the one or more air moving devices 244 and may de-energize the one or more heating elements 242 in an effort to move the air around the musical instrument 900.

Definitions

Unless otherwise stated, the words “up”, “down”, “top”, “bottom”, “upper”, and “lower” should be interpreted within a gravitational framework. “Down” is the direction that gravity would pull an object. “Up” is the opposite of “down”. “Bottom” is the part of an object that is down farther than any other part of the object. “Top” is the part of an object that is up farther than any other part of the object. “Upper” may refer to top and “lower” may refer to the bottom. As a non-limiting example, the upper end of a vertical shaft is the top end of the vertical shaft.

Throughout this document the terms “battery”, “battery pack”, and “batteries” may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, the words “control” or “controls” are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw. In some embodiments, a control may alter an electrical property of a circuit such as resistance, inductance, or capacitance.

As used herein, the words “couple”, “couples”, “coupled” or “coupling”, may refer to connecting, either directly or indirectly, and does not necessarily imply a mechanical connection.

As used in this disclosure, “DC” may be an acronym for direct current.

As used herein, the terms “DC power adapter”, “DC power supply”, “low voltage DC power adapter”, or “low voltage DC power supply” may refer to a power supply that converts an alternating current (AC) input voltage on the order of 110 VAC or 220 VAC, 50 or 60 Hz to a direct-current (DC) voltage. The words “low voltage” in the name indicate that the output DC voltage is 49 VDC or less. Low voltage DC power adapters producing outputs of 3 VDC, 5 VDC, 6 VDC, 9 VDC, and 12 VDC are common and may be used with calculators, cell phones, laptop computers, portable loudspeakers, and other consumer electronics. Low voltage DC power adapters are commonly packaged as small rectangular boxes that either plug directly into an AC outlet and provide a pair of conductors running from the box to a DC power connector or that have an AC line cord extending from one side of the box and a DC power cord extending from the opposing side of the box.

As used herein, “energize” and/or “energization” may refer to the application of an electrical potential to a system or subsystem. “De-energize” and/or “de-energization” may refer to the removal of the electrical potential.

As used in this disclosure, a “fan” may be an electromechanical device with rotating blades that is used to create a flow or current of air.

As used in this disclosure, the word “interior” may be used as a relational term that implies that an object is located or contained within the boundary of a structure or a space.

As used in this disclosure, a “microcontroller” may be a small computer, often on a single integrated circuit, containing a processor core, memory, and programmable input/output peripherals.

As used herein, the terms “processor”, “central processor”, “central processing unit”, “CPU”, or “microprocessor” may refer to a digital device that carries out the instructions comprising a computer program by performing basic arithmetic, logical, control, and input/out operations. The term “microprocessor” may additionally imply a level of miniaturization and power reduction that makes the device suitable for portable or battery operated systems.

As used herein, “rigid” may refer to an object or material which is inflexible.

As used in this disclosure, a “shell” may be a structure that forms an outer covering intended to contain an object. Shells are often, but not necessarily always, rigid or semi-rigid structures that are intended to protect the object contained within it. Some shells may only partially cover the exterior surface of the object.

With respect to the above description, it is to be realized that the optimum dimensional relationship for the various components of the invention described above and in FIGS.

1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A wind instrument electronic warming case comprising:

an instrument case, a temperature control subsystem, and an operator interface;

wherein the temperature control subsystem comprises one or more heating elements and one or more air moving devices that varies the temperature of a musical instrument that is stored within the instrument case;

wherein the operator interface is adapted for a user to monitor and control the operation of the temperature control subsystem;

wherein the instrument case comprises a bottom section and a top section that are hingedly coupled via one or more hinges;

wherein a bottom shaped insert is coupled to the interior of the bottom section;

wherein the bottom shaped insert comprises a plurality of cavities;

wherein the plurality of cavities provide contours that are adapted to accept the musical instrument once the musical instrument has been disassembled;

wherein a top shaped insert is coupled to the interior of the top section;

wherein the top shaped insert is shaped to fit around the temperature control subsystem.

2. The wind instrument electronic warming case according to claim 1 wherein the instrument case is a container for storing the musical instrument;

wherein the bottom section and the top section form a rigid hollow shell;

wherein shaped inserts within the instrument case adapt the instrument case to hold the musical instrument and the temperature control subsystem.

3. The wind instrument electronic warming case according to claim 2 wherein the bottom shaped insert and the top shaped insert are made from a non-scratch material such that the finish of the musical instrument is not damaged when the musical instrument is stored within the instrument case.

4. The wind instrument electronic warming case according to claim 3 wherein the bottom shaped insert and the top shaped insert are made from foam;

wherein the bottom shaped insert and the top shaped insert are lined with velvet.

5. The wind instrument electronic warming case according to claim 3 wherein the instrument case comprises one or more latches located on the side of the instrument case that is opposite the one or more hinges;

wherein the one or more latches hold the instrument case closed until the one or more latches are released.

6. The wind instrument electronic warming case according to claim 5 wherein the temperature control subsystem comprises the one or more heating elements, the one or more air moving devices, and control electronics;

wherein the one or more heating elements heat air within the instrument case when energized;

wherein the one or more air moving devices move the air within the instrument case when energized;

wherein the control electronics controls the energization of the one or more heating elements and the one or more air moving devices to achieve a warming or cooling of the musical instrument stored within the instrument case.

7. The wind instrument electronic warming case according to claim 6 wherein the one or more heating elements convert electrical energy into heat;

wherein the amount of heating produced by the one or more heating elements varies based upon one or more characteristics of the electrical energy applied to the one or more heating elements.

8. The wind instrument electronic warming case according to claim 7 wherein the one or more air moving devices force the movement of the air;

wherein the one or more air moving devices are electromechanical in nature.

9. The wind instrument electronic warming case according to claim 8 wherein the one or more air moving devices move the air within the instrument case such that the air passes over the one or more heating elements;

wherein the one or more air moving devices transfer heat from the one or more heating elements to the musical instrument via the flow of the air.

10. The wind instrument electronic warming case according to claim 9 wherein energization of the one or more air moving devices while the one or more heating elements are not energized results in a non-heated flow of the air over the musical instrument and has a cooling effect upon the musical instrument.

11. The wind instrument electronic warming case according to claim 10 wherein the one or more air moving devices are vented to the outside such that the one or more air moving devices draw the air in from outside of the instrument case, expel the air out of the instrument case, or both.

12. The wind instrument electronic warming case according to claim 11 wherein the control electronics comprises a microcontroller and one or more temperature sensors;

wherein the microcontroller is a microprocessor comprising non-volatile memory for storing a control program, read/write memory for storing data and intermediate computations, one or more input/output ports for interfacing with circuitry located outside of the microcontroller, and a timer circuit for timing intervals.

13. The wind instrument electronic warming case according to claim 12 wherein the one or more temperature sensors measure the temperature of the air and report the temperature to the microcontroller as one or more electrical signals;

wherein the one or more temperature sensors are positioned in the flow of the air.

14. The wind instrument electronic warming case according to claim 13 wherein in at least one mode of operation, the control electronics maintains the temperature of the air at a setpoint temperature by energizing and de-energizing the one or more heating elements and/or the one or more air moving devices.

15. The wind instrument electronic warming case according to claim 14 wherein the operator interface comprises operator controls and an operator display;

wherein the operator interface is adapted for the user to interact with the wind instrument electronic warming case for purposes of monitoring and controlling operation of the wind instrument electronic warming case.

16. The wind instrument electronic warming case according to claim 15 wherein the operator controls comprises a power control, a warm control, a cool control, an up control, and a down control;

wherein the operator controls are electrically coupled to the microcontroller such that the microcontroller detects activations of the operator controls;

wherein the power control energizes and de-energizes the wind instrument electronic warming case;

wherein the warm control selects a heating mode of operation which results in energization of the one or more heating elements with or without the one or more air moving devices;

wherein the cool control selects a cooling mode of operation which results in energization of the one or more air moving devices without the one or more heating elements;

wherein the up control increases the setpoint temperature;

wherein the down control decreases the setpoint temperature.

17. The wind instrument electronic warming case according to claim 16 wherein the operator display is adapted to display a numeric value to the user.

18. The wind instrument electronic warming case according to claim 17 wherein the operator display comprises a four digit numeric display and an AM/PM indicator.

19. The wind instrument electronic warming case according to claim 18 wherein one or more batteries comprise one or more energy-storage devices;

wherein the one or more batteries are a source of electrical energy to operate the temperature control subsystem and the control electronics;

wherein the one or more batteries are rechargeable and/or replaceable;

wherein the one or more batteries are recharged using an external dc power adapter coupled to a recharging port that is accessible on the side wall of the instrument case.

* * * * *